(12) United States Patent
Iwai et al.

(10) Patent No.: US 9,032,229 B2
(45) Date of Patent: May 12, 2015

(54) INFORMATION PROCESSING DEVICE WITH SLEEP CONTROL PROCESSING, CONTROL METHOD AND NON-TRANSITORY COMPUTER READABLE RECORDING MEDIUM

(75) Inventors: Mitsutaka Iwai, Fukuoka (JP); Tetsuji Ohtsuki, Fukuoka (JP); Kazuma Minami, Fukuoka (JP); Hiroyuki Yoshino, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 211 days.

(21) Appl. No.: 13/393,516

(22) PCT Filed: Oct. 29, 2010

(86) PCT No.: PCT/JP2010/006403
§ 371 (c)(1),
(2), (4) Date: Mar. 15, 2012

(87) PCT Pub. No.: WO2011/052227
PCT Pub. Date: May 5, 2011

(65) Prior Publication Data
US 2012/0166833 A1      Jun. 28, 2012

(30) Foreign Application Priority Data

Nov. 2, 2009  (JP) ................................. 2009-251948

(51) Int. Cl.
*G06F 1/32*     (2006.01)
*G06F 9/48*     (2006.01)

(52) U.S. Cl.
CPC ............ *G06F 1/3203* (2013.01); *G06F 1/3206* (2013.01); *G06F 9/4893* (2013.01); *Y02B 60/144* (2013.01)

(58) Field of Classification Search
USPC .................................. 713/310, 320, 323, 324
See application file for complete search history.

(56) References Cited

U.S. PATENT DOCUMENTS 5,553,296 A * 9/1996 Forrest et al. ................. 713/323
5,902,352 A * 5/1999 Chou et al. .................... 718/102
(Continued)

FOREIGN PATENT DOCUMENTS

| JP | 11-327706 | 11/1999 |
| JP | 2000-92254 | 3/2000 |

(Continued)

OTHER PUBLICATIONS

Japanese Office Action dated May 11, 2010.
(Continued)

*Primary Examiner* — Vincent Tran
(74) *Attorney, Agent, or Firm* — Dickinson Wright PLLC

(57) ABSTRACT

An information processing device (1) includes a main CPU (2) and a sub CPU (3). The main CPU (2) is provided with a function of managing schedules of task processing and idle processing and executes sleep control which reduces power consumption of the main CPU (2) as the idle processing when the task processing is not executed. The sub CPU (3) measures elapsed time during which the sleep control is executed, detects an interrupt event occurring during the sleep control, and notifies the elapsed time until the interrupt event occurs to the main CPU (2). The main CPU (2) terminates the sleep control in accordance with the notification of the elapsed time and reflects the elapsed time in the schedule. As a result, inconsistency of a timer caused by the sleep control can be solved, and the information processing device which can use a scheduler correctly even if the sleep control is executed is provided.

9 Claims, 4 Drawing Sheets

(56) References Cited

U.S. PATENT DOCUMENTS

| | | | |
|---|---|---|---|
| 6,064,252 A * | 5/2000 | Nara | 327/544 |
| 6,816,977 B2 * | 11/2004 | Brakmo et al. | 713/323 |
| 2003/0014467 A1 * | 1/2003 | Hanzawa | 709/102 |
| 2003/0196127 A1 * | 10/2003 | Olsen | 713/300 |
| 2003/0212531 A1 | 11/2003 | Kerr | |
| 2006/0190752 A1 * | 8/2006 | Lee | 713/323 |
| 2007/0074219 A1 * | 3/2007 | Ginsberg | 718/102 |
| 2007/0240163 A1 | 10/2007 | Conrad | |
| 2007/0245164 A1 | 10/2007 | Mitarai | |
| 2009/0106572 A1 | 4/2009 | Taguchi | |
| 2009/0307519 A1 * | 12/2009 | Hyatt | 713/502 |

FOREIGN PATENT DOCUMENTS

| | | |
|---|---|---|
| JP | 2003-29886 | 1/2003 |
| JP | 2003-196258 | 7/2003 |
| JP | 2004-38894 | 2/2004 |
| JP | 2004-334563 | 11/2004 |
| JP | 2006-174854 | 7/2006 |

OTHER PUBLICATIONS

International Search Report dated Jan. 25, 2011.
Written Opinion of the International Searching Authority dated Jan. 25, 2011.
European Search Report dated Aug. 22, 2011.

* cited by examiner

INFORMATION PROCESSING DEVICE WITH SLEEP CONTROL PROCESSING, CONTROL METHOD AND NON-TRANSITORY COMPUTER READABLE RECORDING MEDIUM

TECHNICAL FIELD

The present invention relates to an information processing device provided with a main CPU and a sub CPU and particularly to a technology of reducing power consumption.

BACKGROUND ART

Portable battery-driven terminal devices used by transport operators and the like are used continuously for several ten hours in many cases, and how to keep power consumption low has been an important object. As a conventional method for reducing power consumption, sleep control and doze control are used in general (See Patent Literature 1, for example).

In the doze control, a main CPU is brought into a doze state (a state of "shallow sleep" assuming resumption of interruption) and after a predetermined scheduled time of recovery has elapsed or an interrupt event from the outside occurs even before the scheduled time of recovery has elapsed, the CPU is recovered to a normal power operation. The interrupt event while the main CPU is in the doze state is detected by a sub CPU.

However, only with such doze control, power consumption is still large, and achievable continuous use can be only for about ten hours, though depending on a battery capacity. Particularly, with a touch panel terminal device, power consumption for presentation on a large-sized display and power consumption for backlight light source for the display are large, and reduction of power consumption only by the doze control is insufficient.

On the other hand, in the sleep control, a CPU clock is stopped, and the main CPU is brought into a sleep state (a state of "deep sleep" close to power off). In this sleep control, since all the processing (all the processing including internal I/O) of the main CPU is stopped, power consumption can be largely reduced, but if the main CPU is in the sleep state, the CPU clock is also stopped, and a timer in the main CPU goes inconsistent. Therefore, even if the terminal device is provided with schedulers by processing unit such as a task scheduler and a thread scheduler (hereinafter referred merely as a scheduler), the scheduler cannot be used correctly, and an application using the scheduler (application depending on the timer) cannot be implemented, either.

For example, supposing that predetermined task processing is scheduled to be executed 500 milliseconds later by the schedule function of the terminal device, if the main CPU enters the sleep state, the CPU clock is stopped for 400 milliseconds, for example, while in the sleep state, and the main CPU executes the task processing 500 milliseconds after the recovery from the sleep state. As described above, the task should have been executed 100 milliseconds after the recovery from the sleep state of the main CPU, but the timer in the main CPU goes inconsistent due to the sleep control, and the scheduler cannot be used correctly.

CITATION LIST

Patent Literature

[Patent Literature 1]
Japanese Patent Laid-Open No. 2000-92254

SUMMARY OF INVENTION

Technical Problem

The present invention was made in the above-described background. An object of the present invention is to provide an information processing device which can solve inconsistency of a timer caused by sleep control and can correctly use a scheduler even if the sleep control is executed.

Solution to Problem

An aspect of the present invention is an information processing device provided with a main processing unit and a sub processing unit. In this information processing device, the main processing unit includes a task processing unit which executes predetermined task processing, an idle processing unit which executes sleep control which reduces power consumption of the main processing unit as idle processing when the task processing is not executed, and a scheduler unit which manages schedules of the task processing and the idle processing, and the sub processing unit includes a clock unit which measures elapsed time during which the idle processing is executed and an elapsed time notification unit which notifies the main processing unit of the elapsed time until an interrupt event occurring during the idle processing occurs. The idle processing unit terminates the sleep control in accordance with the notification of the elapsed time, and the scheduler unit reflects the elapsed time in the schedule.

Another aspect of the present invention is a control method of the information processing device provided with the main processing unit and the sub processing unit. In this control method, the main processing unit manages schedules of the task processing and the idle processing and executes sleep control which reduces power consumption of the main processing unit as the idle processing when the task processing is not executed, and the sub processing unit measures elapsed time during which the idle processing is executed and notifies the main processing unit of the elapsed time until the interrupt event occurring during the idle processing occurs. The main processing unit terminates the sleep control in accordance with the notification of the elapsed time and reflects the elapsed time in the schedule.

Still another aspect of the present invention is a control program for the information processing device provided with the main processing unit and the sub processing unit. This control program has the main processing unit execute processing of managing the schedules of the task processing and the idle processing, processing of executing sleep control which reduces power consumption of the main processing unit as the idle processing when the task processing is not executed, processing of receiving from the sub processing unit the elapsed time during which the idle processing is executed, that is, the elapsed time until an interrupt event occurs during the idle processing is executed, processing of terminating the sleep control in accordance of the notification of the elapsed time, and processing of reflecting the elapsed time in the schedule.

Still another aspect of the present invention is a control program for the information processing device provided with the main processing unit and the sub processing unit. The main processing unit executes processing of managing the schedules of the task processing and the idle processing and processing of executing the sleep control which reduces power consumption of the main processing unit as idle processing when the task processing is not executed. This control program has the sub processing unit execute processing of measuring the elapsed time during which the idle processing is executed, processing of detecting an interrupt event which occurs while the idle processing is executed, and processing of notifying the main processing unit of the elapsed time until the interrupt time occurs, that is, the elapsed time at which the sleep control is terminated and which should be reflected in the schedule.

As will be described below, the present invention has other aspects. Therefore, this disclosure of the invention is intended to provide a part of the aspects of the present invention and not intended to limit the range of the invention described and claimed herein.

DESCRIPTION OF EMBODIMENTS

Figure 1:
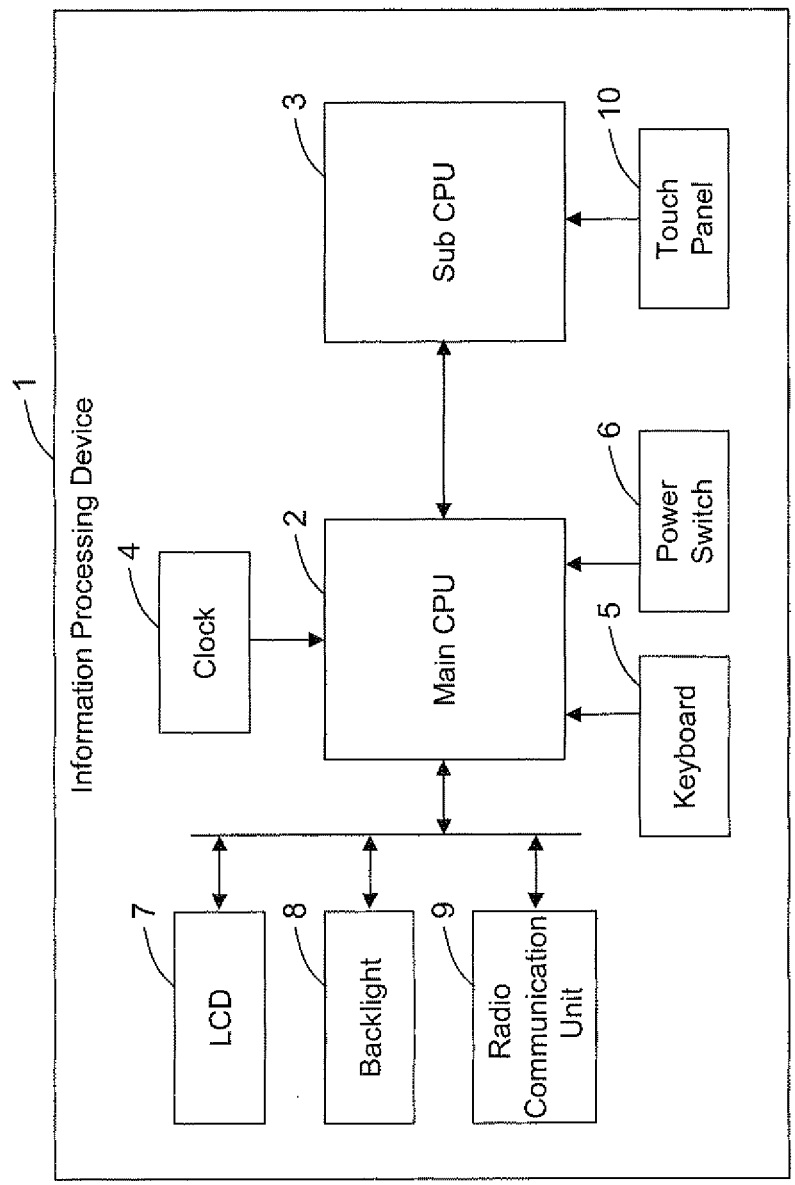
FIG. 1 is a block diagram illustrating a configuration of an information processing device in an embodiment of the present invention.

The present invention will be described below in detail. However, the detailed description and the attached drawings below do not limit the present invention.

An information processing device of the present invention is an information processing device provided with a main processing unit and a sub processing unit, in which the main processing unit includes a task processing unit which executes predetermined task processing, an idle processing unit which executes sleep control which reduces power consumption of the main processing unit as idle processing when the task processing is not executed, and a scheduler unit which manages schedules of the task processing and the idle processing, while the sub processing unit includes a clock unit which measures elapsed time during which the idle processing is executed and an elapsed time notification unit which notifies the main processing unit of the elapsed time until an interrupt event occurring during the idle processing occurs. The idle processing unit terminates the sleep control in accordance with the notification of the elapsed time, and the scheduler unit reflects the elapsed time in the schedule.

By means of this configuration, the sleep control is executed as the idle processing while the task processing is not executed in the main processing unit, whereby power consumption can be largely reduced. In this case, in the sub processing unit, the elapsed time during which the idle processing is executed is measured, and if an interrupt event occurs when the idle processing is executed, elapsed time until the interrupt event occurs is notified to the main processing unit. Then, the main processing unit terminates the sleep control upon receipt of this elapsed time and reflects the elapsed time in the schedule. Therefore, inconsistency of a timer caused by the sleep control can be solved, and the scheduler can be correctly used even if the sleep control is executed.

Moreover, in the information processing device of the present invention, the idle processing unit may have a configuration in which the sleep control is executed as the idle processing if the idle time from the end time of the previous task processing to the wake-up time of the subsequent task processing is longer than a predetermined reference time, and the doze control with a rate of power consumption reduction of the main processing unit smaller than that of the sleep control is executed if the idle time is shorter than the reference time.

By means of this configuration, the sleep control and the doze control are switched as appropriate on the basis of the length of the idle time. That is, if the idle time is long, the sleep control is executed, whereby power consumption can be largely reduced, while if the idle time is short, the doze control is executed. In the doze control, the rate of power consumption reduction is smaller than that of the sleep control, but since recovery to a normal operation can be realized in short time, the subsequent task processing can be responded to quickly.

Moreover, in the information processing device of the present invention, the sub processing unit may have a configuration provided with a determination unit which determines whether or not an input by a touch operation is an erroneous input on the basis of the length of time during which the touch operation is made on a touch panel.

By means of this configuration, whether or not the input by the touch operation is an erroneous input can be determined on the basis of the length of the time during which the touch operation is made on the touch panel. For example, if an erroneous touch operation is made continuously, the length of time during which the touch operation is made becomes extremely long, while if an erroneous touch operation is repeated in short time (chattering), the length of time during which the touch operation is made becomes extremely short. Thus, the input by the touch operation can be determined to be an erroneous input.

Moreover, in the information processing device of the present invention, the idle processing unit may have a configuration of executing the sleep control for a radio communication unit which transmits inputted data via radio communication.

By means of this configuration, the sleep control is executed for the radio communication unit. The radio communication unit which transmits the input data via radio communication consumes large power, and the effect of power consumption reduction by the sleep control is large.

A method of the present invention is a control method of the information processing device provided with the main processing unit and the sub processing unit, in which the main processing unit manages schedules of task processing and idle processing and executes sleep control which reduces power consumption of the main processing unit as idle processing while the task processing is not executed, the sub processing unit measures elapsed time during which the idle processing is executed and notifies the main processing unit of the elapsed time until an interrupt event occurring while the idle processing is executed occurs, and the main processing unit terminates the sleep control in accordance with the notification of the elapsed time and reflects the elapsed time in the schedule.

By means of this method, inconsistency of the timer caused by the sleep control can also be solved similarly to the above device, and the scheduler can be used correctly even if the sleep control is executed.

By means of the method of the present invention, the main processing unit may execute the sleep control as the idle processing if the idle time from the end time of the previous task processing to the wake-up time of the subsequent task processing is longer than a predetermined reference time and may execute the doze control with a rate of power consumption reduction of the main processing unit smaller than that of the sleep control if the idle time is shorter than the reference time.

By means of this method, the sleep control and the doze control can also be switched as appropriate on the basis of the length of the idle time similarly to the above-described device.

A program of the present invention is a control program for the information processing device provided with the main processing unit and the sub processing unit, and the control program has the main processing unit execute processing of managing the schedules of the task processing and the idle processing, processing of executing sleep control which reduces power consumption of the main processing unit as the idle processing when the task processing is not executed, processing of receiving the elapsed time during which the idle processing is executed, that is, the elapsed time until an interrupt event during the idle processing is executed occurs from the sub processing unit, processing of terminating the sleep control in accordance with the notification of the elapsed time, and processing of reflecting the elapsed time in the schedule.

By means of this program, inconsistency of the timer caused by the sleep control can also be solved similarly to the above device, and the scheduler can be used correctly even if the sleep control is executed.

A program of the present invention is a control program for the information processing device provided with the main processing unit and the sub processing unit, and the control program has the main processing unit execute processing of managing the schedules of the task processing and the idle processing and processing of executing the sleep control which reduces power consumption of the main processing unit as idle processing when the task processing is not executed. The control program has the sub processing unit execute processing of measuring the elapsed time during which the idle processing is executed, processing of detecting an interrupt event which occurs when the idle processing is executed, and processing of notifying the main processing unit of the elapsed time until the interrupt time occurs, that is, the elapsed time at which the sleep control is terminated and which should be reflected in the schedule.

By means of this program, inconsistency of the timer caused by the sleep control can also be solved similarly to the above device, and the scheduler can be used correctly even if the sleep control is executed.

In the present invention, since the elapsed time during which the idle processing is executed is reflected in the schedule, inconsistency of the timer caused by the sleep control can be solved, and the scheduler can be used correctly even if the sleep control is executed.

An information processing device of an embodiment of the preset invention will be described below by using the attached drawings. In this embodiment, an information processing device used for a portable battery-driven terminal device or the like for a transport operator is exemplified. This information processing device has a function of executing sleep control for reducing power consumption, and this function is realized by a program stored in a memory or an HDD of the information processing device.

A configuration of the information processing device of the embodiment of the present invention will be described by referring to the attached drawings. FIG. 1 is a block diagram illustrating the configuration of the information processing device of this embodiment. As illustrated in FIG. 1, the information processing device 1 includes a main CPU 2 which can execute various high-level processing with a high-speed operation and consumes large power and a sub CPU 3 which can execute relatively simple processing with a low-speed operation and consumes small power.

The main CPU 2 receives inputs of a clock signal (signal for synchronization among each unit) generated from a clock 4 and an input signal when a user makes an input operation on a keyboard 5 or an ON/OFF operation of a power switch 6. Moreover, this main CPU 2 is provided with a function of controlling a liquid crystal display (LCD) 7 or a backlight 8 thereof and a function of controlling a radio communication unit 9 such as a wireless LAN and Bluetooth (registered trademark). The main CPU 2 can take a normal operation mode with large power consumption and a power-saving mode (a sleep state and a doze state) with small power consumption.

The sub CPU 3 receives inputs of an input signal when the user makes an operation (touch operation) of a touch panel 10. This sub CPU 3 can receive an input signal from the touch panel 10 even if the main CPU 2 is in the sleep state or in the doze state and is provided with a function of executing wake-up processing of recovering the main CPU 2 from the sleep state or the doze state to the normal operation state.

Figure 2:
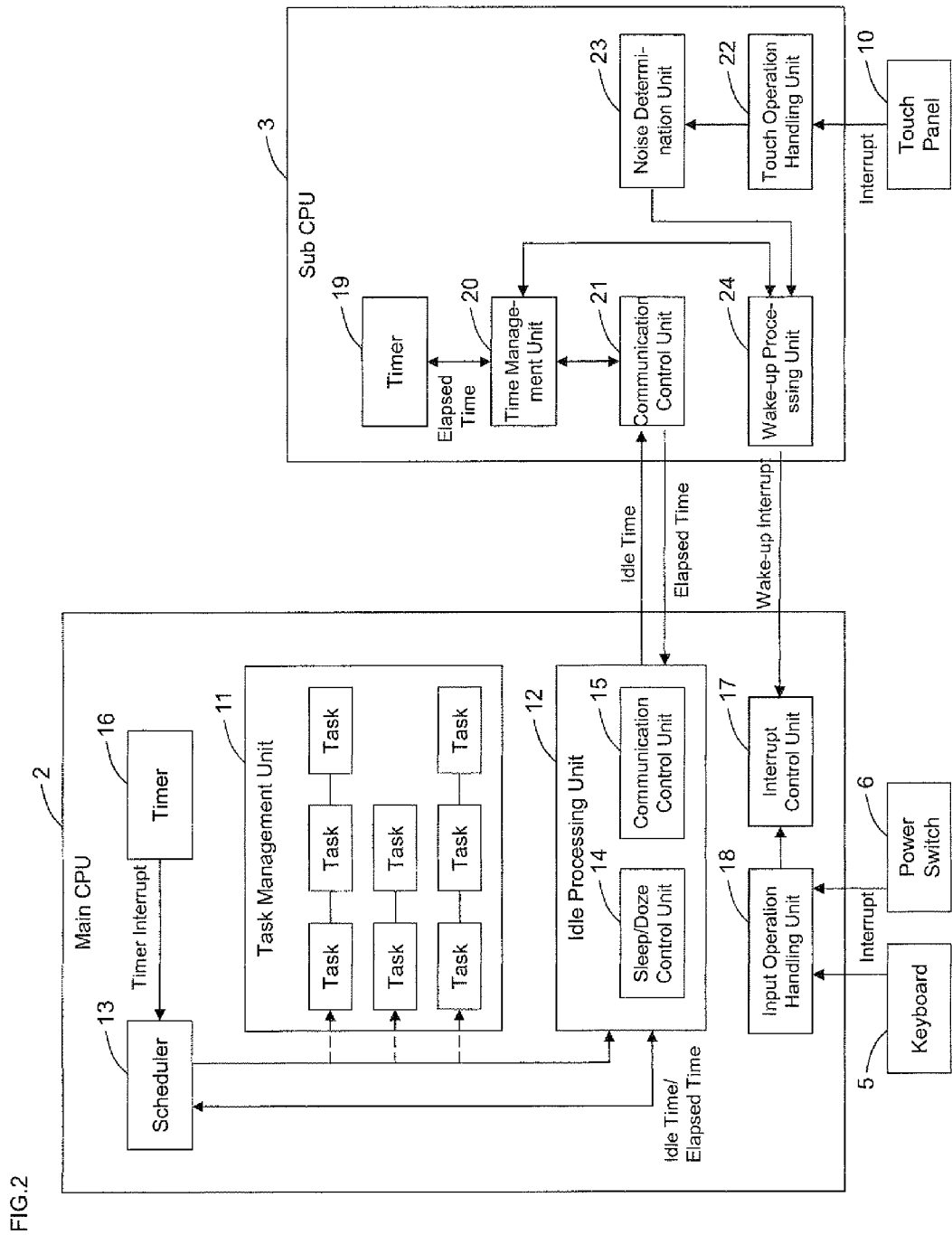
FIG. 2 is an explanatory diagram of functions of a main CPU and a sub CPU of the information processing device.

Functions of the main CPU 2 and the sub CPU 3 will be described below in detail by referring to the attached drawings. FIG. 2 is an explanatory diagram of the functions of the main CPU 2 and the sub CPU 3. As illustrated in FIG. 2, the main CPU 2 includes a task management unit 11 which executes various task processing (data input processing and data transmission processing, for example) and an idle processing unit 12 which executes idle processing when the task processing is not executed. Moreover, the main CPU 2 includes a scheduler 13 which manages schedules of the task processing and the idle processing. The scheduler 13 is provided with a function of notifying an idle control unit of latency time (idle time) from end time of the previous task processing to wake-up time of the subsequent task. Moreover, this scheduler 13 is provided with a function of reflecting elapsed time (elapsed time during which the idle processing is executed) measured by the sub CPU 3 in the schedule as will be described later.

The idle processing unit 12 is provided with a sleep/doze control unit 14 which executes sleep control and doze control which reduce power consumption of the main CPU 2, and this sleep/doze control unit 14 executes the sleep control if the idle time notified by the scheduler is longer than a predetermined reference time (100 milliseconds, for example) and executes the doze control if the idle time is shorter than the reference time. That is, the idle processing unit 12 can be considered to be provided with a function of selecting the idle processing (sleep control or doze control) to be executed from now on in accordance with the length of the idle time notified by the scheduler 13.

Here, the sleep control is control of stopping an arithmetic processing unit built in the main CPU 2 and peripheral functions built in the main CPU 2 such as an input/output control unit/timer control unit, and the main CPU 2 stops an internal clock of the main CPU 2 while the sleep control is executed. An external interrupt handling function can operate even during the sleep control and can be waked-up from the sleep control upon occurrence of the external interrupt. On the other hand, the doze control is control which stops only the arithmetic processing unit built in the main CPU 2, and the internal clock of the main CPU 2 is not stopped. During the doze control, the peripheral functions such as the input/output control unit and timer control unit built in the main CPU 2 and the external interrupt handling function operate and can be waked-up from the doze control upon occurrence of the external interrupt. The external interrupt is interrupt from the sub CPU 3, the keyboard 5, and the power switch 6. Therefore, the sleep control can largely reduce power consumption of the main CPU 2, while the doze control has the rate of power consumption reduction of the main CPU 2 smaller than that of the sleep control.

Moreover, this idle processing unit 12 is provided with a communication control unit 15 which conducts information communication with the sub CPU 3. This communication control unit 15 is provided with a function of sending the idle time notified by the scheduler 13 to the sub CPU 3 and of receiving the elapsed time sent from the sub CPU 3 if the sleep control is executed as described above (if the idle time is longer than the reference time). In that case, the main CPU 2 wakesup the sleep control after notifying the idle time to the sub CPU 3, executes processing from the sleep control on the basis of a wake-up interrupt signal sent from the sub CPU 3, and then, receives the elapsed time from the sub CPU 3. That is, the sleep/doze control unit 14 wakesup the sleep control after notifying the idle time to the sub CPU 3 and ends the sleep control if the elapsed time is notified from the sub CPU 3. Then, this idle processing unit 12 is provided with a function of executing the sleep control for the radio communication unit 9 which transmits data inputted from the keyboard 5 and the touch panel 10 to other devices (higher order devices such as a parent machine, for example) via radio communication. The sleep control for the radio communication unit 9 functions in accordance with the sleep control of the main CPU 2.

Moreover, the main CPU 2 includes a timer 16 for managing the schedules of the task processing and the idle processing. The timer 16 of the main CPU 2 is provided with a function of measuring remaining time until a scheduled time at which the task processing should be executed for each task processing, and the timer sends a timer interrupt signal to the scheduler 13 and notifies the scheduler 13 that the scheduled time to execute the task processing has come. The scheduler 13 has the task management unit 11 execute the subsequent task processing on the basis of this timer interrupt signal. Moreover, the timer 16 of the main CPU 2 is also provided with a function of measuring the elapsed time during which the doze control is executed in the main CPU 2.

Moreover, the main CPU 2 includes an interrupt control unit 17 which processes an interrupt event occurring during the sleep control or the doze control (a touch operation on the touch panel 10 or an input operation on the keyboard 5). This interrupt control unit 17 executes the wake-up processing (recovery processing) from the sleep control on the basis of a wake-up interrupt signal sent from the sub CPU 3 as will be described later if the touch operation on the touch panel 10, the input operation on the keyboard 5 or an ON/OFF operation of the power switch 6 is made while the sleep control is executed. Moreover, this interrupt control unit 17 executes the recovery processing from the doze control on the basis of the interrupt signal received in an input operation handling unit 18 if the touch operation on the touch panel 10, the input operation on the keyboard 5 or an ON/OFF operation of the power switch 6 is made while the doze control is executed.

The sub CPU 3 includes a timer 19 which measures elapsed time during which the idle processing (sleep control) is executed in the main CPU 2 and a timer management unit 20 which manages an operation of this timer 19. This sub CPU 3 includes the communication control unit 21 which conducts information communication with the main CPU 2, and this communication control unit 21 receives idle time from the main CPU 2 and sends it to the timer management unit 20 if the sleep control is executed in the main CPU 2. The timer management unit 20 sets a value obtained by subtracting a predetermined correction value from the idle time to the timer 19 of the sub CPU 3.

This correction value is to correct inconsistency between the idle time notified from the scheduler 13 and time during which the sleep control is actually executed (it takes a small amount of time from notification of the idle time from the scheduler 13 to the start of the sleep control, and inconsistency occurs), that is inconsistency from the notification of the idle time from the scheduler 13 to the start of actual measurement of the elapsed time by the sub CPU 3 or inconsistency from the detection of an interrupt event by the sub CPU 3 to the actual end of the wake-up processing from the sleep control and the like, and it is set to 10 milliseconds, for example.

The sub CPU 3 includes a touch operation handling unit 22 which receives an input signal (interrupt signal) from the touch panel 10, if a touch operation on the touch panel 10 is made while the sleep control is executed by the main CPU 2, and a noise determination unit 23 which determines whether or not an input by the touch operation is an erroneous input on the basis of the length of time during which the touch operation is made. If an erroneous touch operation is made continuously, the length of time during which the touch operation is made becomes extremely long, while if an erroneous touch operation is repeated in short time, the length of time during which the touch operation is made becomes extremely short. The noise determination unit 23 determines that the input by the touch operation is an erroneous input if the length of time during which the touch operation is made is 10 milliseconds or less or 2 seconds or more, for example.

Then, the sub CPU 3 includes a wake-up processing unit 24 for detecting that, if the input made by the touch operation is determined not to be an erroneous input, an interrupt event (a touch operation on the touch panel 10) has occurred while the sleep control is executed in the main CPU 2 and for sending a wake-up interrupt signal to the main CPU 2. At this time, the timer management unit 20 obtains the elapsed time until the interrupt event occurred from the timer 19 of the sub CPU 3. Moreover, the timer management unit 20 generates a timer interrupt event when the timer 19 is timed up, that is, the set idle time has elapsed, and the wake-up processing unit 24 has a function of sending a wake-up interrupt signal to the main CPU 2 in accordance with the timer interrupt event. At this time, the timer management unit 20 obtains elapsed time until the timer interrupt event occurred from the timer 19 of the sub CPU 3. The elapsed time is notified from the communication control unit 21 of the sub CPU 3 to the main CPU 2. Therefore, here, the wake-up processing unit 24 of the sub CPU 3 corresponds to an interrupt event detection unit of the present invention and the communication control unit 21 of the sub CPU 3 corresponds to the elapsed time notification unit of the present invention.

An operation of the information processing device 1 configured as above will be described by referring to the attached drawings. Here, the idle processing (wake-up interrupt processing from the sleep control), which is a characteristic operation of the present invention, will be mainly described.

Figure 3:
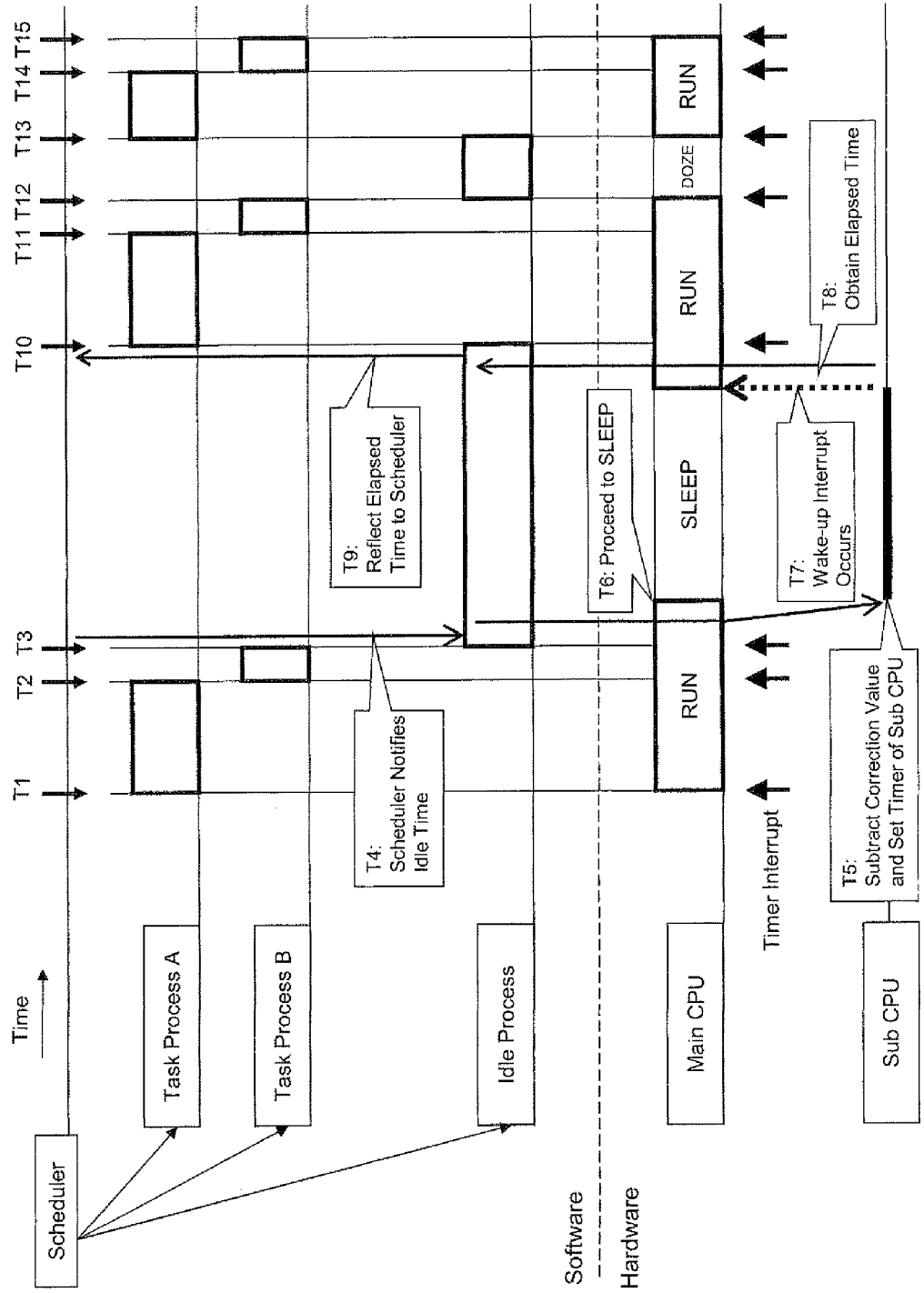
FIG. 3 is an explanatory diagram of an operation of the information processing device in the embodiment of the present invention.

FIG. 3 is an explanatory diagram of the operation of the information processing device 1 in this embodiment. In the example of FIG. 3, first, at time T1, execution of task processing A (data input processing, for example) is waked-up in the main CPU 2, and at time T2, the execution of the task processing A is terminated, and execution of another task processing B (data transmission processing, for example) is waked-up. At time T3, the execution of the task processing B is terminated, and the main CPU 2 executes the idle processing until the subsequent task processing is waked-up.

Supposing that latency time (idle time) until the subsequent task processing is waked-up from the time T3 is 500 milliseconds, for example, the schedule 13 notifies the idle processing unit 12 of the idle time at time T4. In this case, the idle time (500 milliseconds) is longer than a reference time (100 milliseconds), and thus, the idle processing unit 12 notifies the sub CPU 3 of the idle time at time T5 and brings the main CPU 2 into the sleep state at time T6. On the other hand, if the idle time is notified from the main CPU 2, the sub CPU 3 sets a value (490 milliseconds, for example) obtained by subtracting a correction value (10 milliseconds, for example) from the idle time to the timer 19 of the sub CPU 3 at the time T5.

Then, if a touch operation is made by the user on the touch panel 10 before the scheduled time at which the main CPU 2 is recovered from the sleep state (500 milliseconds after the time T3, that is, 490 milliseconds after the time T6), that is, at time T7 340 milliseconds after the time T6, for example, the sub CPU 3 sends the wake-up interrupt signal to the main CPU 2 and the main CPU 2 is recovered (waked-up) from the sleep state. After that, at time T8, the sub CPU 3 obtains the elapsed time (340 milliseconds) from the time T6 at which the main CPU 2 proceeds to the sleep state to the time T7 at which the interrupt event (touch operation) occurs from the timer 19 of the sub CPU 3 and notifies it to the main CPU 2.

Moreover, if an input operation on the keyboard 5 or an ON/OFF operation of the power switch 6 is made by the user before the scheduled time at which the main CPU 2 is recovered from the sleep state, the main CPU 2 is recovered (waked-up) from the sleep state on the basis of the interrupt signal received by the input operation handling unit 18. After that, the main CPU 2 obtains the elapsed time from the time T6 at which the main CPU 2 proceeds to the sleep state to the time (corresponding to the time T7 of the sub CPU 3, not shown) of occurrence of the interrupt event (the input operation on the keyboard 5 and the like) from the timer 16.

The main CPU 2 reflects the elapsed time (340 milliseconds) in the scheduler 13 at time T9. In this case, the scheduler 13 of the main CPU 2 had been scheduled to wake-up the subsequent task processing 500 milliseconds after the time T3 (490 milliseconds after the time T6) but the main CPU 2 entered the sleep state at the time T6 and the clock 4 of the main CPU 2 was also stopped, and thus, the timer 16 of the main CPU 2 was stopped at "after 490 milliseconds" at the time T6. This is rescheduled so that the subsequent task processing is waked-up 150 milliseconds (=490 milliseconds−340 milliseconds) after the time T9 by reflecting the elapsed time (340 milliseconds) in the scheduler 13 at the time T9.

When the main CPU 2 is recovered from the sleep state, first, the main CPU 2 executes the processing relating to the interrupt event (the touch operation on the touch panel 10, the input operation on the keyboard 5 and the like). For example, the task processing A (data input processing, for example) for the interrupt event (the touch operation on the touch panel 10, the input operation on the keyboard 5 and the like) is executed at time T10, and the task processing B (data transmission processing, for example) for the interrupt event (the touch operation on the touch panel 10, the input operation on the keyboard 5 and the like) is executed at time T11. In this case, suppose that it takes 100 milliseconds from the recovery of the main CPU 2 from the sleep state until all the processing is terminated.

When the processing for the interrupt event (the touch operation on the touch panel 10, the input operation on the keyboard 5 and the like) is terminated, the idle processing is executed until the wake-up of the subsequent task processing at time T12 (100 milliseconds after the time T7). In this case, since the idle time (50 milliseconds=150 milliseconds−100 milliseconds) is shorter than the reference time (100 milliseconds), the idle processing unit 12 executes the doze control of the main CPU 2 at the time T12.

Then, the main CPU 2 is recovered from the doze state at time T13 50 milliseconds after the time T12, executes the scheduled subsequent task processing A, and moreover, executes the subsequent task processing B at time T14. In the example in FIG. 3, the task processing B is terminated at time T15.

Though not shown, if no touch operation is made on the touch panel 10 by the user until the scheduled time of recovery (490 milliseconds after the time T6) set to the timer 19 of the main CPU 2 from the sleep state, the timer 19 is timed up at the set scheduled time, a timer interrupt event occurs, the sub CPU 3 sends the wake-up interrupt signal to the main CPU 2, and the main CPU 2 is recovered from the sleep state. After that, similarly to the above, the main CPU 2 reflects the elapsed time notified from the sub CPU in the scheduler 13, and the task processing is rescheduled. Here, if an interrupt event occurs by the touch operation on the touch panel 10 by the user by the time at which the main CPU 2 is scheduled to be recovered from the sleep state as described above, the timer interrupt event here does not occur, and a wake-up interrupt signal on the basis of the timer interrupt event is not sent.

Figure 4:
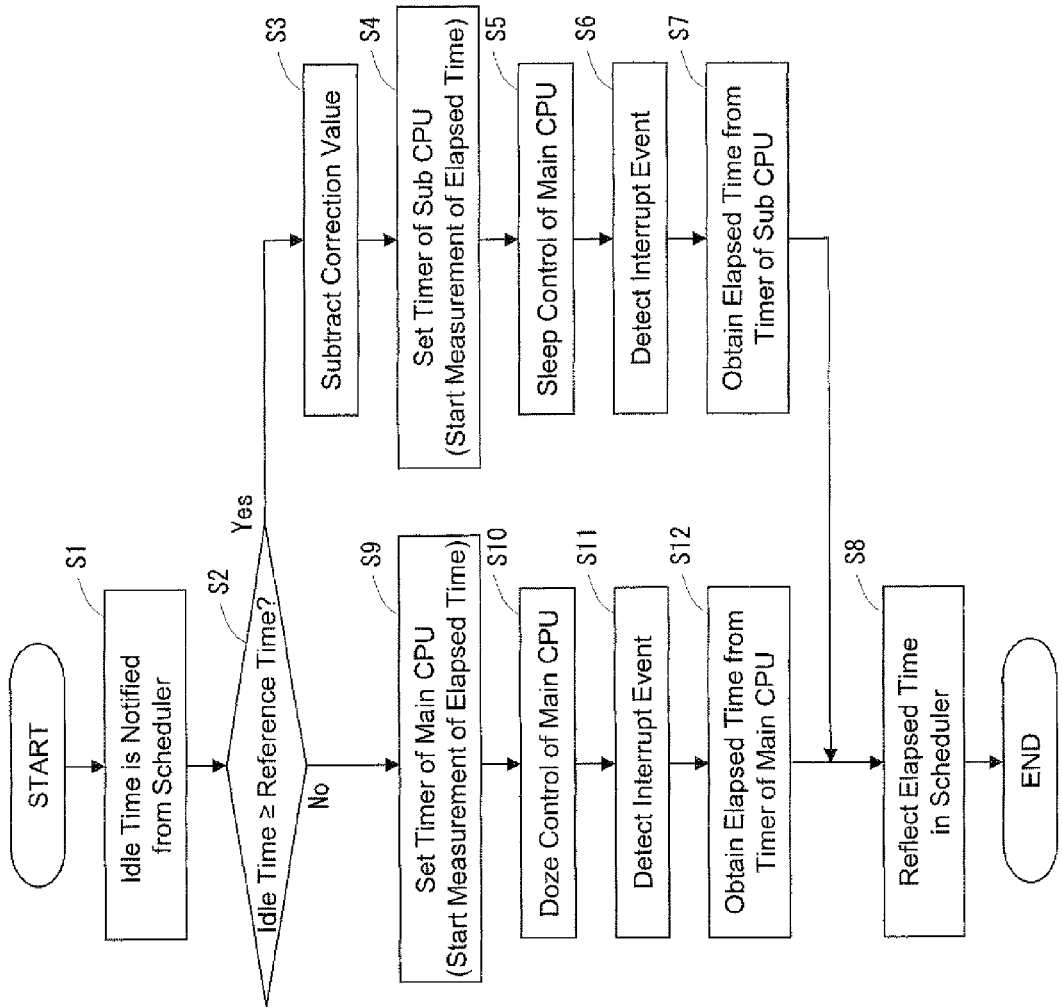
FIG. 4 is a flowchart illustrating a flow of idle processing in the information processing device.

FIG. 4 is a flowchart illustrating a flow of the idle processing in the information processing device 1. As illustrated in FIG. 4, when the idle time is notified from the scheduler 13 (S1), the idle processing unit 12 of the main CPU 2 determines whether or not the idle time is longer than the reference time (S2).

If the idle time is not less than the reference time, the idle time is notified from the main CPU 2 to the sub CPU 3, the correction value is subtracted from the idle time in the sub CPU 3 (S3) and set to the timer 19 of the sub CPU 3, and measurement of the elapsed time is waked-up (S4). Then, after the main CPU 2 proceeds to the sleep state (S5), if the interrupt event (an input operation on the keyboard 5 or the like) is detected by the main CPU 2 or if the interrupt event (a touch operation on the touch panel 10) is detected by the sub CPU 3 (S6), the main CPU 2 obtains the elapsed time from the sub CPU 3 (S7) and reflects the elapsed time in the scheduler 13 (S8).

On the other hand, if the idle time is less than the reference time, the idle time is set to the timer 16 of the main CPU 2, and measurement of the elapsed time is waked-up (99). Then, after the main CPU 2 proceeds to the doze state (S10), if the interrupt event (an input operation on the keyboard 5 or the like) is detected by the main CPU 2 or if the interrupt event (a touch operation on the touch panel 10) is detected by the sub CPU 3 (S11), the main CPU 2 obtains the elapsed time from the timer 16 of the main CPU 2 (S12) and reflects the elapsed time in the scheduler 13 (S8).

According to the information processing device 1 of the embodiment of the present invention, the elapsed time during which the idle processing (sleep control) is executed in the main CPU 2 is measured by the sub CPU 3 and the elapsed time is reflected in the schedule. Thus, inconsistency of the timer 16 of the main CPU 2 caused by the sleep control can be solved, and the scheduler 13 of the main CPU 2 can be correctly used even if the sleep control is executed.

That is, in this embodiment, the sleep control is executed as the idle processing when the task processing is not executed in the main CPU 2, and power consumption can be largely reduced. In this case, the elapsed time during which the idle processing (sleep control) is executed is measured in the sub CPU 3, and if an interrupt event (a touch operation on the touch panel 10) occurs while the idle processing is executed, the elapsed time until the interrupt event occurs is notified to the main CPU 2. Moreover, if an interrupt event (an input operation on the keyboard 5 or the like) occurs on the basis of the input operation while the idle processing is executed, the main CPU 2 obtains the elapsed time until the interrupt event occurs from the timer 16. Then, if the elapsed time is received, the main CPU 2 terminates the sleep control and reflects the elapsed time in the schedule. Therefore, inconsistency of the timer 16 of the main CPU 2 caused by the sleep control can be solved, and the scheduler 13 of the main CPU 2 can be correctly used even if the sleep control is executed.

Moreover, in this embodiment, the sleep control and the doze control are switched as appropriate on the basis of the length of the idle time. That is, if the idle time is not less than the reference time, the sleep control is executed, whereby power consumption can be largely reduced, while if the idle time is less than the reference time, the doze control is executed. In the doze control, the rate of power consumption reduction is smaller than that of the sleep control, but since recovery to a normal operation can be realized in short time, the subsequent task processing can be responded to quickly.

Moreover, in this embodiment, whether or not the input by the touch operation is an erroneous input can be determined on the basis of the length of the time during which the touch operation is made on the touch panel 10. For example, if an erroneous touch operation is made continuously, the length of time during which the touch operation is made becomes extremely long, while if an erroneous touch operation is repeated in short time (chattering), the length of time during which the touch operation is made becomes extremely short. Thus, the input by the touch operation can be determined to be an erroneous input.

Moreover, in this embodiment, the sleep control is executed for the radio communication unit 9 such as a wireless LAN, Bluetooth (registered trademark) and the like. The radio communication unit 9 which transmits the input data via radio communication consumes large power, and the effect of power consumption reduction by the sleep control is large. Moreover, if the information processing device 1 is a data collecting terminal in which data reception frequency is far less than data transmission frequency in the radio communication unit 9 and time from transmission/reception to the subsequent transmission/reception is often longer than the reference time of the idle time, occurrence of interrupt in the main CPU 2 by data reception is less, and the sleep control can be executed for a long time continuously while the doze control is kept less frequent, and thus the effect of further reducing power consumption by the sleep control can be obtained.

Moreover, in this embodiment, the sleep control and the doze control are waked-up by the same wake-up factors (interrupt by the touch operation on the touch panel 10, the input operation on the keyboard 5 or the ON/OFF operation of the power switch 6) by the user operation. Power consumption can be reduced by the sleep control while consistent operability is maintained without making the user notice the difference between the sleep control and the doze control.

The embodiment of the present invention has been described by exemplification in the above, but the scope of the present invention is not limited by that but can be changed or modified in accordance with the purpose within the scope described in the claims. For example, input means which is operated by the user so as to input into the sub CPU 3 can be similarly put into practice by a key pad handling an input by a key button operation, symbol reader means which reads one-dimensional barcodes or two-dimensional symbols or radio communication means which conducts communication using electromagnetic waves or infrared rays, and they may be input means providing an input into the main CPU 2. Moreover, the measurement of the elapsed time of the doze control can be similarly put into practice by setting the idle time in the timer 19 of the sub CPU 3 and by measuring it with the sub CPU 3.

Preferred embodiments of the present invention which can be conceived of at the present have been described, but it can be understood that various modifications are possible for this embodiment and it is intended that the appended claims include all such modifications within the true spirit and scope of the present invention.

INDUSTRIAL APPLICABILITY

As described above, the information processing device according to the present invention has such an effect that can solve inconsistency of a timer caused by the sleep control and can use the scheduler correctly even if the sleep control is executed and is useful as a portable battery-driven terminal device and the like for a transport operator.

REFERENCE SIGNS LIST

1 Information processing device
2 Main CPU
3 Sub CPU
4 Clock
5 Keyboard
6 Power switch
7 Liquid crystal display (LCD)
8 Backlight
9 Radio communication unit
10 Touch panel
11 Task Management unit
12 Idle processing unit
13 Scheduler
14 Sleep/doze control unit
15 Communication control unit
16 Timer
17 Interrupt control unit
18 Input operation handling unit
19 Timer
20 Timer management unit
21 Communication control unit
22 Touch operation handling unit
23 Noise determination unit
24 Wake-up processing unit

The invention claimed is:

1. An information processing device comprising a main processor and a sub processor, wherein:
said main processor includes:
a task processor which executes predetermined task processing;
an idle processor which executes selectively first idle processing which reduces power consumption of said main processor and second idle processing which reduces power consumption of said main processor to a higher level than said first idle processing when said task processing is not executed;

a scheduler which manages a schedule of said task processing, said first idle processing, and said second idle processing;

a first clock which measures first elapsed time during which said first idle processing is executed; and a first elapsed time notifier which notifies said processor of said first elapsed time until occurrence of an interrupt event occurring by inputting from a device during said first idle processing;

said sub processor includes:

a second clock which measures second elapsed time during which second idle processing is executed; and a second elapsed time notifier which notifies said main processor of said elapsed time until occurrence of an interrupt event occurring by inputting from a device during said second idle processing.

2. The information processing device according to claim 1, wherein said idle processor terminates said first or second idle processing in accordance with the notification of said wake-up interrupt.

3. The information processing device according to claim 1, wherein when said idle processor terminates said first idle processing, said first elapsed time notifier notifies said main processor of said elapsed time.

4. The information processing device according to claim 1, wherein when said idle processor terminates said first idle processing, said scheduler reflects said first elapsed time in said schedule.

5. The information processing device according to claim 1, wherein said second clock sleeps during said first idle processing.

6. The information processing device according to claim 1, wherein said idle processor executes the first idle processing if a time period from end time of previous task processing to wake-up time of subsequent task processing is not less than a predetermined reference time, and executes the second idle processing if the time period is less than said reference time.

7. A control method of an information processing device provided with a main processor and a sub processor, wherein:

said main processor:

manages schedules of task processing and idle processing and executes selectively first idle processing which reduces power consumption of said main processor and second idle processing which reduces power consumption of said main processor to a higher level than said first idle processing when said task processing is not executed;

measures first elapsed time during which said first idle processing is executed; and notifies said processor of said first elapsed time until occurrence of an interrupt event occurring by inputting from a device during said first idle processing;

said sub processor:

measures second elapsed time during which second idle processing is executed; and notifies said main processor of said elapsed time until occurrence of an interrupt event occurring by inputting from a device during said second idle processing.

8. A non-transitory computer readable recording medium that stores control program for an information processing device provided with a main processor and a sub processor, wherein:

said program makes said main processor execute:

processing of managing schedules of task processing and idle processing;

processing of executing selectively first idle processing which reduces power consumption of said main processor and second idle processing which reduces power consumption of said main processor to a higher level than said first idle processing when said task processing is not executed;

processing of measuring first elapsed time during which said first idle processing is executed; and processing of notifying said processor of said first elapsed time until occurrence of an interrupt event occurring by inputting from a device during said first idle processing; and said program makes said sub processor execute:

processing of measuring second elapsed time during which second idle processing is executed; and processing of notifying said main processor of said elapsed time until occurrence of an interrupt event occurring by inputting from a device during said second idle processing.

9. A non-transitory computer readable recording medium that stores control program for an information processing device provided with a main processor and a sub processor, wherein:

said program makes said main processor execute:

processing of managing schedules of task processing and idle processing and processing of executing selectively first idle processing which reduces power consumption of said main processor and second idle processing which reduces power consumption of said main processor to a higher level than said first idle processing when said task processing is not executed are executed;

processing of measuring first elapsed time during which said first idle processing is executed; and processing of notifying said processor of said first elapsed time until occurrence of an interrupt event occurring by inputting from a device during said first idle processing; and said program makes said sub processor execute:

processing of measuring second elapsed time during which second idle processing is executed; and processing of notifying said main processor of said elapsed time until occurrence of an interrupt event occurring by inputting from a device during said second idle processing.

* * * * *